US009263946B2

(12) United States Patent
Matsui

(10) Patent No.: US 9,263,946 B2
(45) Date of Patent: Feb. 16, 2016

(54) POWER SUPPLY APPARATUS, POWER SUPPLY SYSTEM AND POWER SUPPLY METHOD

(71) Applicant: ROHM CO., LTD., Kyoto (JP)

(72) Inventor: Shigekane Matsui, Kyoto (JP)

(73) Assignee: ROHM CO., LTD. (JP)

( * ) Notice: Subject to any disclaimer, the term of this patent is extended or adjusted under 35 U.S.C. 154(b) by 259 days.

(21) Appl. No.: 13/951,967

(22) Filed: Jul. 26, 2013

(65) Prior Publication Data

US 2014/0159690 A1  Jun. 12, 2014

(30) Foreign Application Priority Data

Jul. 27, 2012  (JP) .................................. 2012-166654

(51) Int. Cl.
*H02M 3/157* (2006.01)
*H02M 1/00* (2007.01)

(52) U.S. Cl.
CPC ...... *H02M 3/157* (2013.01); *H02M 2001/0035* (2013.01); *Y02B 70/16* (2013.01)

(58) Field of Classification Search
CPC ............... H02M 3/156; H02M 3/157; H02M 2001/0032; H02M 2001/0041
USPC ................................................. 323/282–285
See application file for complete search history.

(56) References Cited

U.S. PATENT DOCUMENTS 6,304,462 B1 * 10/2001 Balakrishnan et al. .... 363/21.01
6,330,234 B1 * 12/2001 Tomasi et al. ................ 370/342
8,248,046 B2 * 8/2012 Hasegawa ..................... 323/271
8,872,494 B2 * 10/2014 Hirakawa ...................... 323/282
9,030,180 B2 * 5/2015 Deguchi et al. ............... 323/282
2006/0055574 A1 * 3/2006 Maksimovic et al. ........ 341/155
2007/0216372 A1 * 9/2007 Weng et al. ................... 323/222
2008/0315865 A1 * 12/2008 Doogue et al. ................ 324/173
2010/0066328 A1 * 3/2010 Shimizu et al. ............... 323/282
2010/0213910 A1 * 8/2010 Chen ............................. 323/282
2010/0289471 A1 * 11/2010 Kasai et al. ................... 323/282
2010/0321963 A1 * 12/2010 Yamashita ................. 363/21.17
2011/0291630 A1 * 12/2011 Konstadinidis et al. ...... 323/283
2012/0038341 A1 * 2/2012 Michishita et al. ........... 323/284
2013/0043851 A1 * 2/2013 Ishino ........................... 323/282
2013/0051088 A1 * 2/2013 Yamashita ................. 363/21.13
2013/0329475 A1 * 12/2013 Rice ........................... 363/56.01
2014/0097819 A1 * 4/2014 Matsui .......................... 323/283

FOREIGN PATENT DOCUMENTS

JP  2005512493 A  4/2005
JP  2009071978 A  4/2009

* cited by examiner

*Primary Examiner* — Matthew Nguyen
*Assistant Examiner* — Kyle J Moody
(74) *Attorney, Agent, or Firm* — Cantor Colburn LLP

(57) ABSTRACT

A power supply apparatus, comprising: a driver connected to a power source voltage and configured to perform an ON/OFF operation of power supply to a load; a digital control circuit configured to perform an ON/OFF control of the driver; and an oscillator configured to output an oscillator signal for performing the ON/OFF control of the driver every constant period. The digital control circuit operates in a normal control mode in which the output operation of the oscillator signal by the oscillator and the ON/OFF operation of the driver are continuously activated, or in a low power control mode in which the output operation of the oscillator signal by the oscillator and the ON/OFF operation of the driver are intermittently activated.

11 Claims, 4 Drawing Sheets

POWER SUPPLY APPARATUS, POWER SUPPLY SYSTEM AND POWER SUPPLY METHOD

CROSS-REFERENCE TO RELATED APPLICATION

This application is based upon and claims the benefit of priority from Japanese Patent Application No. 2012-166654, filed on Jul. 27, 2012, the entire contents of which are incorporated herein by reference.

TECHNICAL FIELD

The present disclosure relates to a power supply apparatus, a power supply system and a power supply method, and in particular, to an adjustment of a setting being digitally executed (e.g., change of parameter or software) to thereby eliminate the need for a redesign according to the specifications or the environment of an equipment (a load) to which the power is being supplied, without lowering the efficiency even when a small amount of power is supplied.

BACKGROUND

Generally, in a power conversion apparatus, particularly, in an apparatus for performing a DC power conversion, a power supply apparatus that controls electric power for supplying to a load by an ON/OFF control of a switching element is well known.

The power supply apparatus may include an analog circuit system and a digital circuit system.

However, since the power supply apparatus of the conventional analog circuit system uses a switching power source realized by an analog circuit, it is difficult to change the setting of the power supply apparatus. Therefore, there is a problem when adjusting a ripple voltage or a switching frequency according to the specifications of the equipment to which power is supplied.

Further, since the power supply apparatus of the conventional digital circuit system uses a digital controller for a high frequency voltage regulator, which is implemented in a digital circuit, the power supply apparatus oscillates high frequency clock pulses. In particularly, when power consumption by the equipment to which power is supplied is small, since the power consumption of the digital controller is relatively large, there is a need to reduce the power consumption of the digital controller.

SUMMARY

Various embodiments for a power supply apparatus and a power supply method, which can execute an adjustment setting with only a digital setting (change of parameter or software) and eliminate the need for a redesign according to the specifications or the environment of the equipment to which power is supplied, without lowering the efficiency even when a small amount of power is supplied.

According to an aspect of the present disclosure, there is provided a power supply apparatus, comprising: a driver connected to a power source voltage and configured to perform an ON/OFF operation of power supply to a load; a digital control circuit configured to perform an ON/OFF control of the driver; and an oscillator configured to output an oscillator signal for performing the ON/OFF control of the driver every constant period. The digital control circuit operates in a normal control mode in which the output operation of the oscillator signal by the oscillator and the ON/OFF operation of the driver are continuously activated, or in a low power control mode in which the output operation of the oscillator signal by the oscillator and the ON/OFF operation of the driver are intermittently activated.

According to another aspect of the present disclosure, there is provided a power supply method, comprising: a digital control step of performing an ON/OFF control of a driver; and an oscillation step of outputting an oscillator signal for performing the ON/OFF control of the driver every constant period. The digital control step has a normal control mode in which the output operation of the oscillator signal by the oscillator and the ON/OFF operation of the driver are continuously activated, and a low power control mode in which the output operation of the oscillator signal by the oscillator and the ON/OFF operation of the driver are intermittently activated.

DETAILED DESCRIPTION

Figure 1:
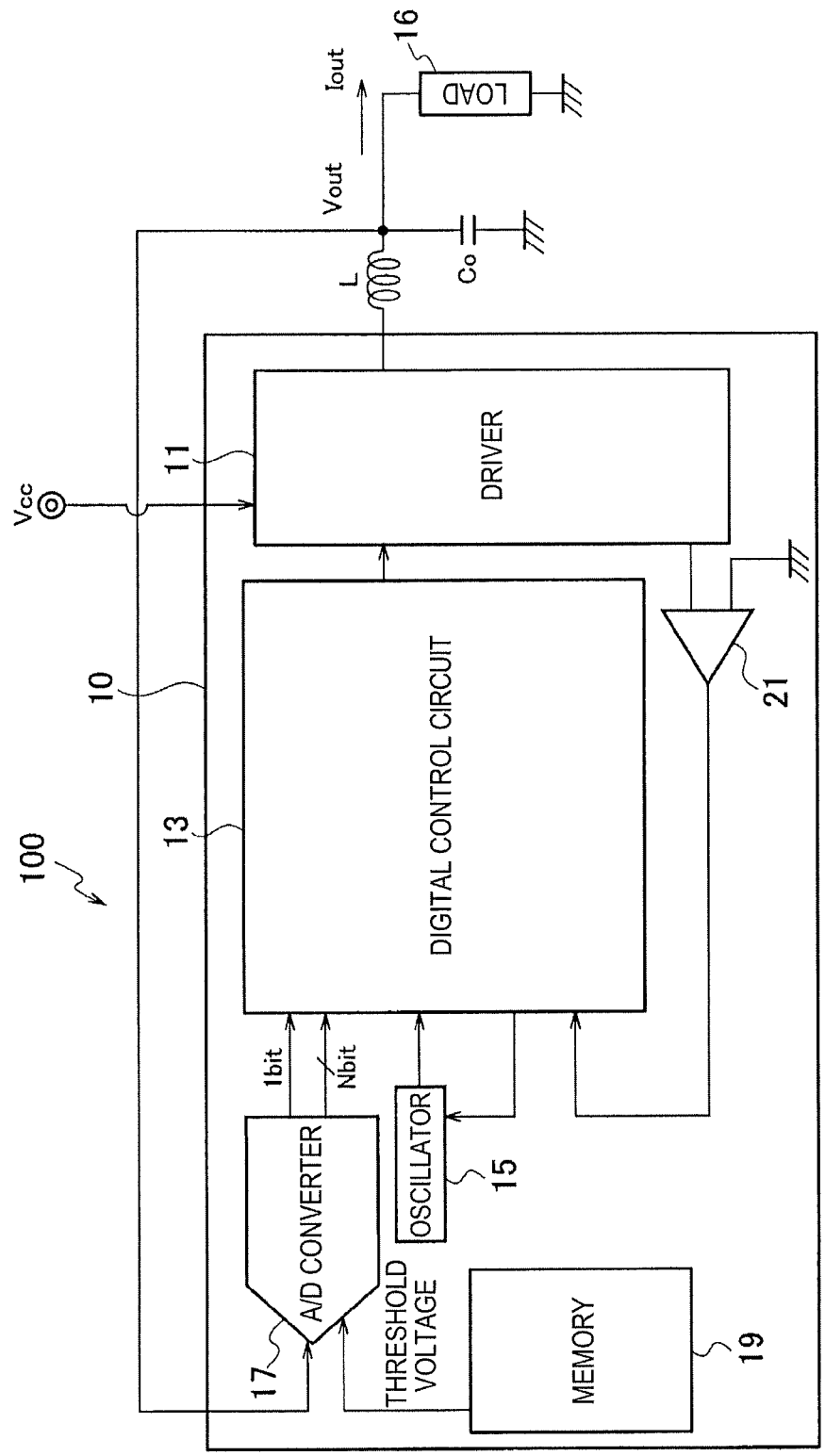
FIG. 1 is a schematic diagram showing a configuration of a power supply system according to an embodiment.

Reference will now be made in detail to various embodiments, examples of which are illustrated in the accompanying drawings. In the following detailed description, numerous specific details are set forth in order to provide a thorough understanding of the present invention(s). However, it will be apparent to one of ordinary skill in the art that the present invention(s) may be practiced without these specific details. In other instances, well-known methods, procedures, systems, and components have not been described in detail so as not to unnecessarily obscure aspects of the various embodiments.

Next, embodiments of the present disclosure will be described with reference to the drawings. Throughout the drawings, same or similar elements are denoted by same or similar reference numerals.

The following embodiments are provided to illustrate devices and methods to embody the technical ideas of the present disclosure and are not intended to limit material, shape, structure, arrangement and so on of elements to those recited in the disclosed embodiments of the present disclosure. The disclosed embodiments may be modified in various ways without departing from the spirit and scope of the present disclosure set forth in the claims.

(Outline of Power Supply System)

FIG. 1 is a schematic diagram showing a configuration of a power supply system 100 according to an embodiment. As shown in FIG. 1, the power supply system 100 according to the embodiment includes a power supply apparatus 10, a coil L, a capacitor Co and a load 16. For example, the power supply apparatus 10 is a switching power source apparatus. The coil L is connected to the power supply apparatus 10. The capacitor Co and the load 16 are connected to the coil L. A power source voltage Vcc is inputted to the power supply apparatus 10 as an input power source voltage, and an output voltage Vout is outputted from a connection node of the capacitor Co and the coil L.

The power supply apparatus 10 is connected to the load 16 to supply power to the load 16. The load 16 may be, for example, a mobile apparatus including a cellular phone, a smartphone, a personal digital assistant (PDA), an optical disk apparatus, a digital camera, a wireless communication apparatus and the like, or components thereof.

The power supply apparatus 10 includes a driver 11, a digital control circuit 13, an oscillator 15 and a comparator 21. The driver 11 is connected to the power source voltage Vcc and performs an ON/OFF operation of the power supply to the load 16. The digital control circuit 13 performs an ON/OFF control of the driver 11. The oscillator 15 outputs an oscillator signal for turning on/off the driver 11 to the digital control circuit 13 every constant period, for example, every clock period of 1 MHz. The comparator 21 detects an output current of the driver 11.

The digital control circuit 13 has a normal control mode and a low power control mode. In the normal control mode, an output operation of the oscillator signal by the oscillator 15 and the ON/OFF operation of the driver 11 are performed continuously. In the low power control mode, the output operation of the oscillator signal by the oscillator 15 and the ON/OFF operation of the driver 11 are performed intermittently.

The digital control circuit 13 sets the switching between the normal control mode and the low power control mode based on a current detected by the comparator 21, and controls the driver 11 and the oscillator 15 based on the set control mode.

The digital control circuit 13 stops the output operation of the oscillator signal by the oscillator 15 and the ON/OFF operation of the driver 11 when the digital control circuit 13 is switched from the normal control mode to the low power control mode. Specifically, the digital control circuit 13 is switched from a continuous operation state in the normal control mode to an intermittent operation state in the in low power control mode only when it is necessary.

The oscillator 15 outputs the oscillator signal (clock period signal) for turning ON/OFF the driver 11 to the digital control circuit 13. The oscillator 15 has a function of turning on and off the output of the oscillator signal. The oscillator 15 continuously outputs the clock period signal (always EN signal ON) in the normal control mode, and intermittently outputs the clock period signal in the low power control mode. That is, the oscillator 15 outputs the clock period signal when the EN signal is ON and stops the clock period signal when the EN signal is OFF in the low power control mode, thereby enabling an intermittent operation.

The power supply apparatus 10 includes an A/D converter 17. The A/D converter 17 compares the output voltage Vout outputted from the connection node of the coil L, which is current controlled by the driver 11, and the capacitor Co, which is connected to the coil L, with a predetermined threshold voltage VTH.

The digital control circuit 13 starts the ON/OFF operation of the driver 11 when the low power control mode is set and the output voltage Vout is equal to or less than the threshold voltage VTH by a comparison result of the A/D converter 17.

The digital control circuit 13 stops the output operation of the oscillator signal by the oscillator 15 and then activates the output operation after a predetermined time, when the low power control mode is set.

Specifically, the digital control circuit 13 turns on the driver 11 immediately when the output operation of the oscillator signal of the oscillator 15 is stopped and a lowered voltage condition (i.e., the condition that the output voltage Vout is equal to or less than the threshold voltage VTH) is detected by the A/D converter 17. When the driver 11 is activated for the predetermined time and the output value of the A/D converter 17 is reversed (i.e., the output voltage Vout becomes equal to or more than the threshold voltage VTH), the digital control circuit 13 turns off the driver 11. That is, the digital control circuit 13 activates the output operation of the oscillator signal of the oscillator 15 for the predetermined time, and stops the output operation when the output voltage Vout is determined to be equal to or more than the threshold voltage VTH by the comparison result of the A/D converter 17. The ON/OFF operation may be repeated for the predetermined time.

When the low power control mode is set, the digital control circuit 13 activates the output operation and sets the normal control mode if the number of times that the output operation of the oscillator signal by the oscillator 15 is consecutively stopped reaches a predetermined consecutive repetitive number of times. That is, the control mode of the digital control circuit 13 is switched from the low power control mode to the normal control mode and a continuous operation is performed, when the number of times that the output operation of the oscillator signal by the oscillator 15 is consecutively stopped reaches the predetermined consecutive repetitive number of times.

(Detailed Configuration of Power Supply Apparatus)

The configuration of the power supply apparatus 10 of the power supply system according to the embodiment will be described in detail.

As shown in FIG. 1, a schematic circuit configuration of the power supply apparatus 10 includes the driver 11, the digital control circuit 13, the coil L, the capacitor Co, the oscillator (OSC) 15, the A/D converter 17, a memory 19 and the comparator 21. The driver 11 is connected to the power source voltage Vcc and performs the ON/OFF operation. The digital control circuit 13 performs the ON/OFF control of the driver 11. The coil L controls the amount of current that flows to the driver 11. The capacitor Co is connected to the coil L and performs a rectification operation together with the coil L. The oscillator 15 outputs the oscillator signal for performing the ON/OFF control of the driver 11 every constant period such as the clock period of 1 MHz. The A/D converter 17 compares the output voltage Vout outputted from the connection node of the capacitor Co and the coil L with the predetermined threshold voltage VTH. The memory 19 supplies the threshold voltage VTH to the A/D converter 17. The comparator 21 detects the output current of the driver 11.

Also, the driver 11 has a switch element (not shown) and turns on/off the switch element. For example, the switch element may be configured by a CMOSFET (Complementary Metal Oxide Semiconductor Field Effect Transistor) including a P channel MOSFET whose drain is connected to the coil L and source is connected to the power source voltage Vcc, and an N channel MOSFET whose drain is connected to the coil L and source is connected to a ground potential.

The digital control circuit 13 operates in the normal control mode or the low power control mode. The normal control mode is a control mode in which the output operation of the oscillator signal by the oscillator 15 and the ON/OFF operation of the driver 11 are continuously activated. The low power control mode is a control mode in which the output operation of the oscillator signal by the oscillator 15 and the ON/OFF operation of the driver 11 are activated intermittently. Since the low power control mode intermittently activates the output operation of the oscillator signal by the oscillator 15 and the ON/OFF operation of the driver 11, the low power control mode can reduce the power consumption in comparison with the normal control mode.

The digital control circuit 13 sets to switch between the normal control mode and the low power control mode based on the current detected by the comparator 21, and controls the driver 11 and the oscillator 15 based on the set control mode.

Specifically, the digital control circuit 13 stops the output operation of the oscillator signal by the oscillator 15 and the ON/OFF operation of the driver 11 when the control mode is switched from the normal control mode to the low power control mode. Also, the digital control circuit 13 starts the ON/OFF operation of the driver 11 when the low power control mode is set and the output voltage Vout is determined to be equal to or less than the threshold voltage VTH by the comparison result of the A/D converter 17.

The A/D converter 17 also includes a low power function, which is switched from an n bit conversion to a 1 bit conversion when the control mode is switched from the normal mode to the low power mode. That is, the A/D converter 17 operates in an n bit mode (e.g., 10 bit mode), which performs the A/D conversion by n-bit (e.g., 10 bits), and a 1 bit mode, which compares the output voltage Vout with the threshold voltage VTH by 1-bit, as described later. The A/D converter 17 operates in the n bit mode when the normal control mode is set, and operates in the 1 bit mode when the low power control mode is set. That is, the A/D converter 17 becomes a comparator in the 1 bit mode.

Also, the digital control circuit 13 stops the output operation of the oscillator signal by the oscillator 15 and then activates the output operation after a lapse of a predetermined time, when the low power control mode is set.

Specifically, the digital control circuit 13 turns on the driver 11 immediately when the oscillator signal of the oscillator 15 is stopped and a lowered voltage condition (i.e., the condition that the output voltage Vout is equal to or less than the threshold voltage VTH) is detected by the A/D converter 17. When the driver 11 is activated for the predetermined time and the output value of the A/D converter 17 is reversed (i.e., the output voltage Vout becomes equal to or more than the threshold voltage VTH), the digital control circuit 13 turns off the driver 11. That is, the digital control circuit 13 activates the output operation of the oscillator signal of the oscillator 15 for the predetermined time, and stops the output operation when the output voltage VOUT is determined to be more than or equal to the threshold voltage VTH by the comparison result of the A/D converter 17. The ON/OFF operation may be repeated for the predetermined time.

When the low power control mode is set, the digital control circuit 13 activates the output operation and sets the normal control mode if the number of times that the output operation of the oscillator signal by the oscillator 15 is consecutively stopped reaches the predetermined consecutive repetitive number of times. That is, a control mode of the digital control circuit 13 is switched from the low power control mode to the normal control mode and a continuous operation is performed, when the number of times that the output operation of the oscillator signal by the oscillator 15 is consecutively stopped reaches the predetermined consecutive repetitive number of times.

Figure 2:
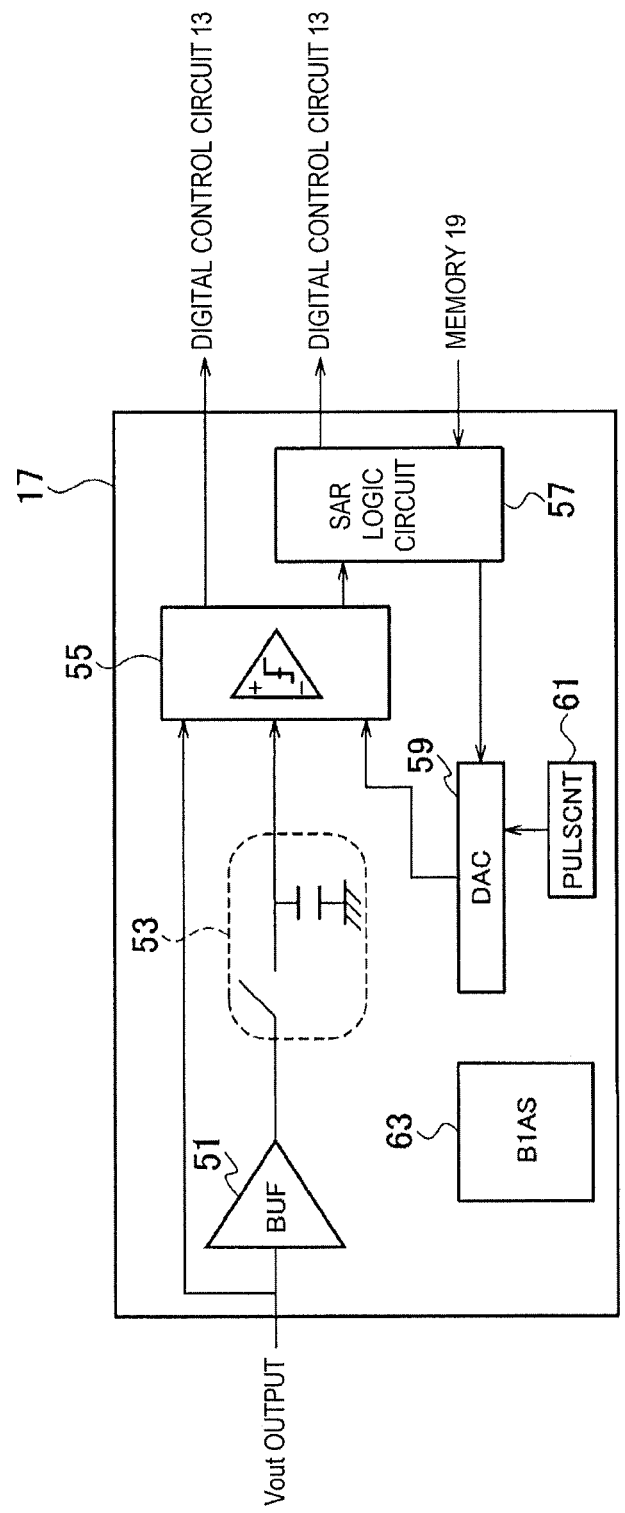
FIG. 2 is a schematic diagram showing a configuration of an A/D converter included in a power supply apparatus of the power supply system according to the embodiment.

FIG. 2 is a diagram showing the A/D converter 17 included in the power supply apparatus 10 of the power supply system 100 according to the embodiment.

The A/D converter 17 operates in the n bit mode or the 1 bit mode. The A/D converter 17 compares the output voltage Vout outputted from the connection node of the capacitor CO and the coil L with the predetermined threshold voltage VTH in the 1 bit mode, when the low power control mode is set.

Specifically, the A/D converter 17 includes a buffer (BUF) 51, an S/H circuit 53, a comparator unit 55, a successive approximation register (SAR) logic circuit 57, a digital to analog converter (DAC) 59, a pulse count generator (PULSCNT) 61 and a bias circuit 63, as shown in FIG. 2. The BUF 51 temporarily stores the output voltage Vout. The S/H circuit 53 stores the output voltage Vout supplied from the BUF 51. The comparator unit 55 compares input values. The SAR logic circuit 57 temporarily stores the comparison result supplied from the comparator unit 55 and supplies the threshold voltage VTH supplied from the memory 19 to the DAC 59. The DAC 59 converts digital signals into analog signals. The PULSCNT 61 generates a pulse count.

The A/D converter 17 operates in the n bit mode (e.g., 10 bit mode), which performs the A/D conversion by the n-bit, and the 1 bit mode, which compares the output voltage Vout with the threshold voltage VTH by the 1-bit. The A/D converter 17 operates in the n bit mode (e.g., 10 bit mode) when the normal control mode is set, and operates in the 1 bit mode when the low power control mode is set.

Also, the A/D converter 17 performs the A/D conversion of the threshold voltage VTH by looping the comparator unit 55, the SAR logic circuit 57 and the DAC 59 about 10 times when the normal control mode is set (e.g., when operating in the 10 bit mode).

When the low power control mode is set (when operating in the 1 bit mode), the A/D converter 17 compares the output voltage Vout with the threshold voltage VTH by using the comparator unit 55, the DAC 59, the PULSCNT 61 and the bias circuit 63. Specifically, the threshold voltage VTH is supplied to the comparator unit 55 through the DAC 59, and the output voltage Vout is supplied to the comparator unit 55 from the BUF 51.

The comparator unit 55 compares the output voltage Vout with the threshold voltage VTH. The comparator unit 55 supplies an OFF signal to the digital control circuit 13 when the output voltage Vout exceeds the threshold voltage VTH. The comparator unit 55 supplies an ON signal to the digital control circuit 13 when the output voltage Vout is equal to or less than the threshold voltage VTH.

As describe above, since the A/D converter 17 operates to switch between the n bit mode (10 bit mode), which performs the A/D conversion by the n-bit, and the 1 bit mode, which compares the output voltage Vout with the threshold voltage VTH by the 1-bit, it is possible to save hardware resources since the same hardware components may be used to realize an A/D conversion function and a comparison function.

(Operation of Power Supply Apparatus)

Next, the operation of the power supply apparatus 10 of the power supply system 100 according to the embodiment will be described.

Figure 3:
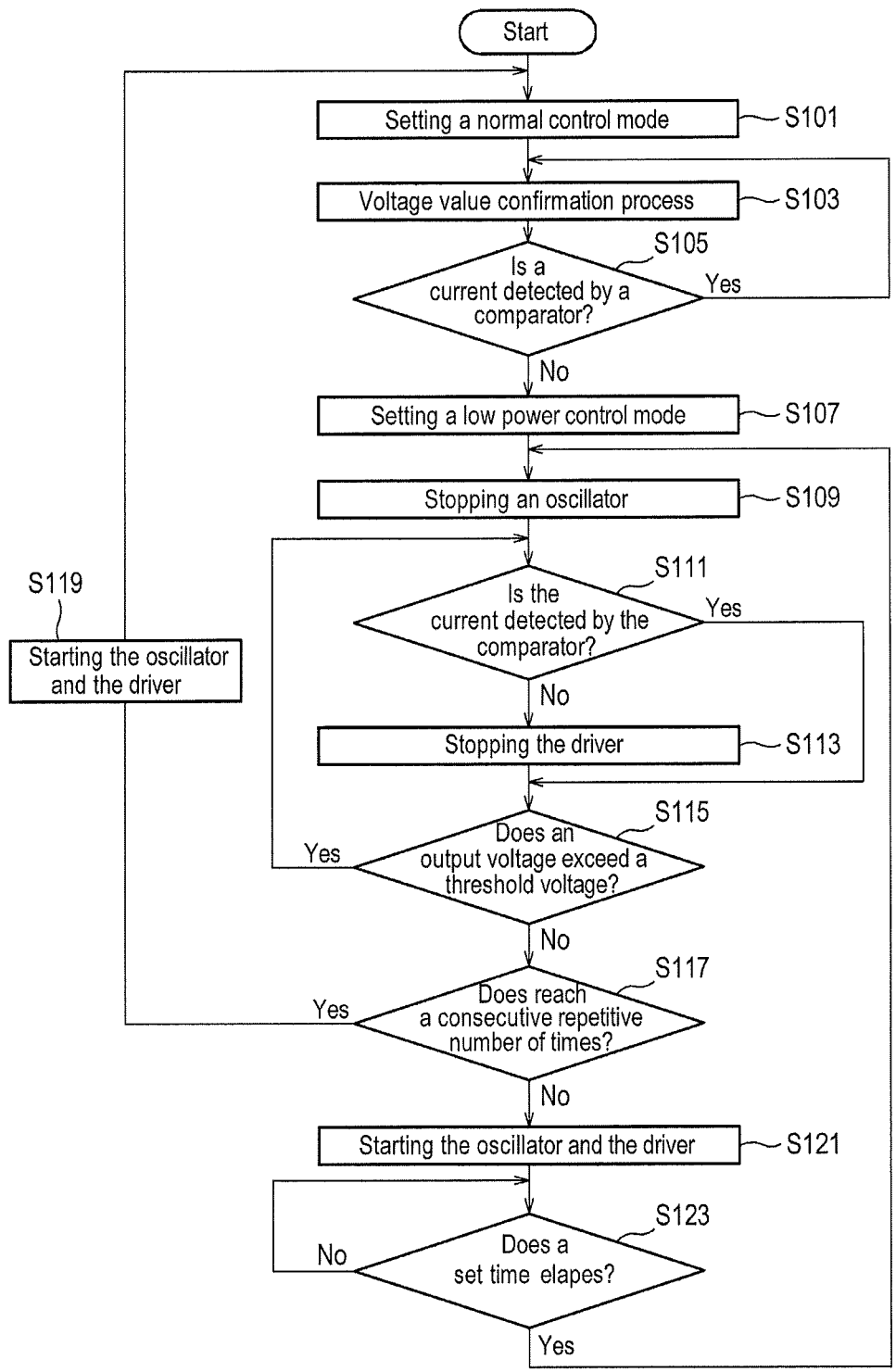
FIG. 3 is a flowchart showing a process procedure by the power supply apparatus of the power supply system according to the embodiment.

FIG. 3 is a flowchart showing a process procedure by the power supply apparatus 10 of the power supply system 100 according to the embodiment.

(a) As shown in FIG. 3, at first, the normal control mode is set when the power supply apparatus 10 is powered on (step S101). As a result, the output operation of the oscillator signal by the oscillator 15, and various operations of each component included in the power supply apparatus 10, for example the ON/OFF operation of the driver 11 and the like are continuously performed.

(b) Next, a voltage value confirmation process is performed (step S103). Herein, since the normal control mode is set, the A/D converter 17 confirms a voltage value in the 10 bit mode. That is, the A/D converter 17 converts an analog voltage value into a digital voltage value.

(c) Next, the comparator 21 determines whether or not the output current of the driver 11 is detected (step S105).

(d) In the step S105, if it is determined that the output current of the driver 11 is detected by the comparator 21, the process proceeds to the step S103. Meanwhile, if it is determined that the output current of the driver 11 is not detected, that is, the current value falls to "0 (A)", the digital control circuit 13 sets the low power control mode as the control mode (step S107). As a result, the output operation of the oscillator signal by the oscillator 15 and the ON/OFF operation of the driver 11 are intermittently activated.

(e) When the low power control mode is set, the output operation of the oscillator signal by the oscillator 15 is stopped (step S109).

(f) Then, the comparator 21 determines whether or not the output current of the driver 11 is detected (step S111).

(g) In the step S111, if it is determined that the output current of driver 11 is not detected by the comparator 21, that is, the current value falls to "0 (A)" (NO), the digital control circuit 13 stops the ON/OFF operation of the driver 11 (step S113).

(h) Then, it is determined whether or not the output voltage Vout exceeds the threshold voltage VTH (step S115). Specifically, since the low power control mode is set, the A/D converter 17 operates in the 1 bit mode to compare the output voltage Vout with the threshold voltage VTH by using the comparator unit 55, the DAC 59, the PULSCNT 61 and the bias circuit 63. The A/D converter 17 supplies the OFF signal to the digital control circuit 13 when the output voltage Vout exceeds the threshold voltage VTH, and supplies the ON signal to the digital control circuit 13 when the output voltage VOUT is equal to or less than the threshold voltage VTH.

(i) In the step S111, if it is determined that the output current of the driver 11 is detected, the process does not perform the step S113 and proceeds to the step S115.

(j) In the step S115, if it is determined that the output voltage Vout exceeds the threshold voltage VTH (YES), that is, the OFF signal is supplied to the digital control circuit 13, the process proceeds to the step S111.

(k) In the step S115, if it is determined that the output voltage Vout is equal to or less than the threshold value VTH (NO), that is, the ON signal is supplied to the digital control circuit 13, the digital control circuit 13 determines whether or not the number of times that the output operation has been consecutively stopped reaches the consecutive repetitive number of times (step S117). Herein, the consecutive repetitive number of times is an upper limit of the number of times that the output operation of the oscillator signal is executed by the oscillator 15, which operates intermittently, when the low power control mode is set. The consecutive repetitive number of times may be set previously. That is, the consecutive repetitive number of times means the number of times that the output operation of the oscillator signal by the oscillator 15, which operates intermittently and is turned on only for predetermined time duration, is repeated consecutively. The set period of the low power control mode is determined by the consecutive repetitive number of times. Herein, the consecutive repetitive number of times is set as "3".

(l) In the step S117, if it is determined that the number of times the output operation is consecutively stopped reaches the consecutive repetitive number of the times (YES), the output operation of the oscillator signal by the oscillator 15 and the ON/OFF operation of the driver 11 are started (step S119).

(m) In the step S117, if it is determined that the number of times the output operation is consecutively stopped is equal to or less than the consecutive repetitive number of times (NO), the output operation of the oscillator signal by the oscillator 15 and the ON/OFF operation of the driver 11 are started (step S121), and then it is determined whether or not a set time elapses (step S123). The set time is a time between the start of the output operation of the oscillator signal of the oscillator 15 and the stop of the output operation of the oscillator signal of the oscillator 15, when the low power control mode is set. The set time is a predetermined time.

Figure 4:
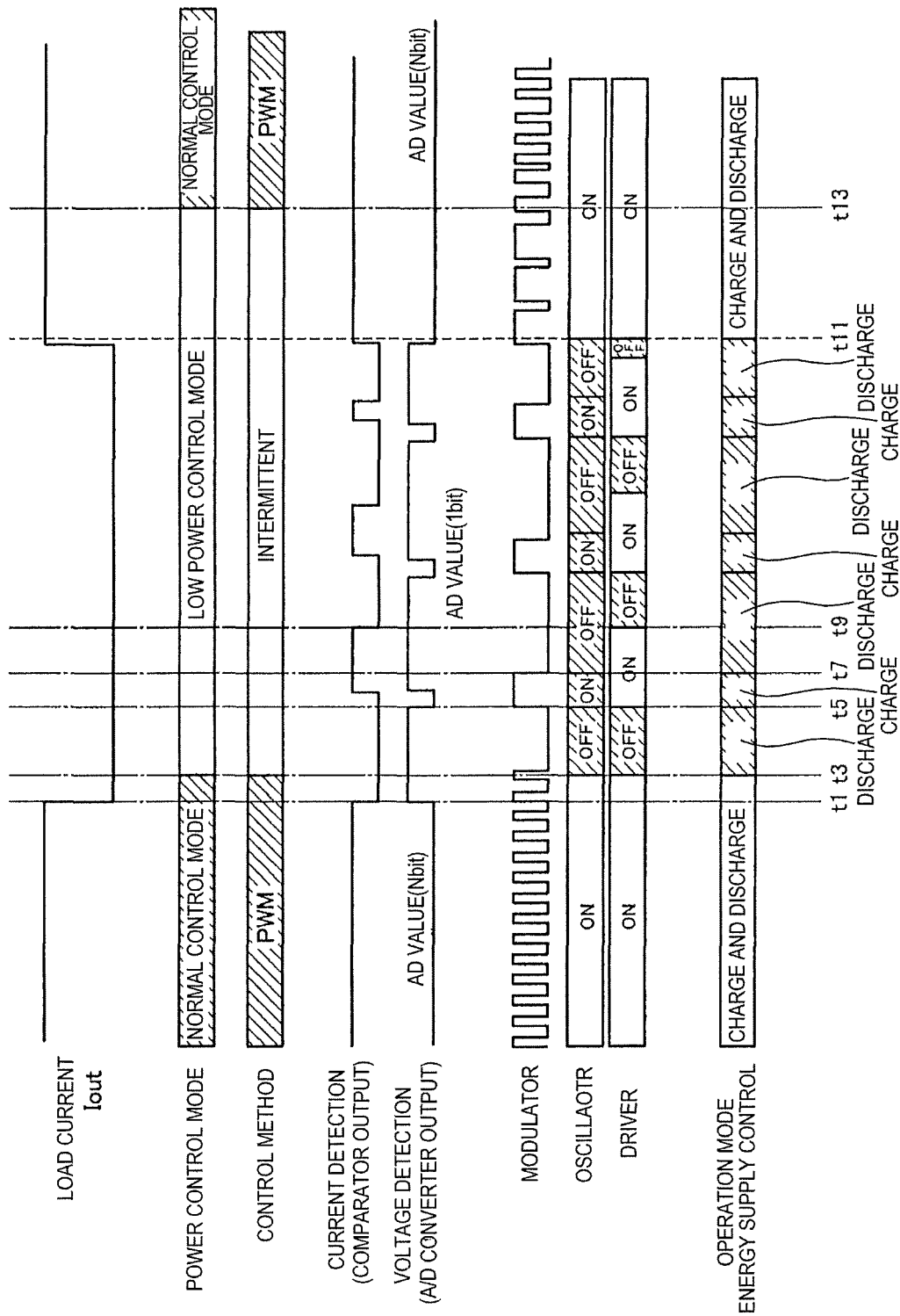
FIG. 4 is a timing chart of the power supply apparatus of the power supply system according to the embodiment.

FIG. 4 is a timing chart of the power supply apparatus 10 of the power supply system 100 according to the embodiment.

As shown in FIG. 4, when the output current of the driver 11 is not detected by the comparator 21, that is, the output signal of the comparator 21 becomes a low level at time t1, the control mode is switched from the normal control mode to the low power control mode at time t3.

As a result, the output operation of the oscillator signal by the oscillator 15 and the ON/OFF operation of the driver 11 are stopped. Since the power supply is stopped as the ON/OFF operation of the driver 11 is stopped, a self-discharge of the capacitor Co is started.

At time t5, when the output voltage Vout is equal to or less than the threshold voltage VTH and the output signal from the A/D converter 17 becomes a low level, the output operation of the oscillator signal of the oscillator 15 and the ON/OFF operation of the driver 11 are started. As a result, since the power supply resumes, the charge of the capacitor Co is started.

At time t7 that a predetermined time has elapsed from time t5, the output operation of the oscillator signal of the oscillator 15 is stopped.

At time t9, since the output signal from the comparator 21 becomes a low level, and the output voltage Vout exceeds the threshold voltage VTH, that is, the output signal from the A/D converter 17 becomes a high level, the ON/OFF operation of the driver 11 is stopped.

Since the consecutive repetitive number of times is set as "3", at time t11, it is determined that the number of times the output operation is consecutively stopped exceeds the consecutive repetitive number of times, and the output operation of the oscillator signal of the oscillator 15 and the ON/OFF operation of the driver 11 are started.

Then, the control mode of the digital control circuit 13 is switched from the low power control mode to the normal control mode at time t13. As a result, the output operation of the oscillator signal by the oscillator 15, and various operations of each component included in the power supply apparatus 10, for example the ON/OFF operation of the driver 11 and the like are continuously performed.

According to the power supply apparatus 10 of the embodiment, the digital control circuit 13 operates in the normal control mode and in the low power control mode, sets to switch between the normal control mode and the low power control mode based on the current detected by the comparator 21, and controls the driver 11 and the oscillator 15 based on the set control mode. Therefore, it is possible to reduce the power consumption for the period when the power supply apparatus operates in the low power control mode. For example, when the power consumption in the normal control mode is 1 (μW), it is possible to reduce the power consumption up to about 100 (μW) in the low power control mode.

Also, since the digital control circuit 13 controls the driver 11 and the oscillator 15 in the low power control mode when the power consumption of the load 16 is small, and controls the driver 11 and the oscillator 15 in the normal control mode when the power consumption of the load 16 is large, it is possible to reduce the ratio of the power consumption of the power supply apparatus 10 to the power consumption of the load 16.

Further, since the digital control circuit 13 performs the control operations, it is possible to easily adjust various settings such as a ripple voltage and the switching frequency according to the specifications of the load 16.

According to the present disclosure, it is possible to provide a power supply method, comprising: a digital control step of performing the ON/OFF control of the driver 11; an oscillation step of outputting the oscillator signal for performing the ON/OFF control of the driver 11 every constant period; and a current detection step of detecting the output current of the driver 11. The digital control step has the normal control mode for continuously actuating the output operation of the oscillator signal by the oscillation step and the ON/OFF operation of the driver 11, and the low power control mode for intermittently actuating the output operation of the oscillator signal by the oscillation step and the ON/OFF operation of the driver.

Also, according to the present disclosure, it is possible to provide the power supply method in which the digital control step may set to switch between the normal control mode and the low power control mode based on the current detected by the current detection step, and the driver 11 and the oscillator 15 is controlled based on the set control mode.

As described above, according to the present disclosure, it is possible to provide the power supply device, the power supply system and the power supply method, which can execute an adjustment by a digital setting and eliminate the need for a redesign according to the specifications or the environment of the equipment (load) to which power is supplied without lowering the efficiency even when a small power is supplied.

Other Embodiment

Although the embodiments of the present disclosure have been described in the above, it should be understood that the description and the drawings which constitutes a part of the present disclosure do not limit the spirit of the present disclosure. Various alternative embodiments and operation techniques of the present disclosure are apparent to those skilled in the art.

It goes without saying that the present disclosure embraces many different embodiments not disclosed herein. Accordingly, the technical scope of the present disclosure is decided by only the subject matters defined in the claims.

In an apparatus for performing a DC power conversion, the power supply apparatus and the power supply method of the present disclosure may be applied to a power conversion apparatus such as a switching power source apparatus for controlling electric power supplied to the load by the ON/OF control of a switching element included therein.

According to the present disclosure, it is possible to provide the power supply device, the power supply system and the power supply method, which can execute an adjustment setting merely with a digital setting (change of parameter or software) and eliminate the need for a redesign according to the specifications or the environment of the equipment to which power is supplied without lowering the efficiency even when a small power is supplied.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A power supply apparatus comprising:
    a driver connected to a power source voltage and configured to perform an ON/OFF operation of power supply to a load;
    a digital control circuit configured to perform an ON/OFF control of the driver;
    a comparator configured to compare an output voltage outputted from an output node of a coil connected to the driver with a predetermined threshold voltage, the output node of the coil being connected to a capacitor; and
    an oscillator configured to output an oscillator signal for controlling the driver,
    wherein the digital control circuit operates in a normal control mode in which an output operation of the oscillator and the ON/OFF control of the driver are continuously activated simultaneously, and in a low power control mode in which the output operation of the oscillator is intermittently activated and the ON/OFF control of the driver is intermittently activated,
    wherein the digital control circuit is configured to operate in an n-bit mode in which the output voltage is converted into a digital voltage value by n-bits and in a 1-bit mode in which the output voltage is compared with the threshold voltage by 1 bit based on a comparison result of the comparator, and
    wherein the comparator is configured to compare the output voltage outputted from the output node of the capacitor and the coil with the predetermined threshold voltage in the 1-bit mode, when the low power control mode is set.

2. The power supply apparatus of claim 1, further comprising:
    a current detector configured to detect an output current of the driver,
    wherein the digital control circuit is configured to set to switch between the normal control mode and the low power control mode based on a current detected by the current detector.

3. The power supply apparatus of claim 2, wherein the digital control circuit is configured to operate in the n-bit mode if the current detector detects the output current for the digital control circuit to switch into the normal control mode when the digital control circuit operates in the low power mode, and the output operation of the oscillator signal by the oscillator is continuously activated if the current detector detects the output current for the digital control circuit to switch into the normal control mode when the digital control circuit operates in the low power mode.

4. The power supply apparatus of claim 3, wherein the digital control circuit is configured to operate in the normal control mode and to activate the output operation of the oscillator if a number of times that the ON/OFF operation of power supply is consecutively and repeatedly stopped reaches a predetermined number of times when the low power control mode is set.

5. The power supply apparatus of claim 1, wherein the digital control circuit is configured to stop the output operation of the oscillator and the ON/OFF control of the driver when the control mode is switched from the normal control mode to the low power control mode.

6. The power supply apparatus of claim 1, wherein the digital control circuit is configured to start the output operation of the oscillator when the low power control mode is set and the output voltage is determined to be equal to or less than the predetermined threshold voltage by the comparison result of the comparator.

7. The power supply apparatus of claim 1, wherein the digital control circuit is configured to activate the output operation of the oscillator and then stop the output operation of the oscillator after a lapse of a predetermined time, when the low power control mode is set.

8. The power supply apparatus of claim 1, wherein the digital control circuit is configured to operate in the normal control mode and to activate the output operation of the oscillator if a number of times that the ON/OFF operation of power supply is repeated reaches a predetermined number of times when the low power control mode is set.

9. The power supply apparatus of claim 1, wherein the driver comprises a switching element.

10. A power supply system, comprising:
   a power supply apparatus according to claim 1; and
   a load to which power from the power supply apparatus is supplied.

11. The power supply system of claim 10, wherein the load is a mobile device including anyone of a cellular phone, a smart phone, a personal digital assistant, an optical disk device, a digital camera and a wireless communication device, or components of the mobile device.

* * * * *